(12) United States Patent
Bertolotti

(10) Patent No.: US 7,719,127 B2
(45) Date of Patent: May 18, 2010

(54) WIND POWER SYSTEM FOR ENERGY PRODUCTION

(75) Inventor: Fabio Paolo Bertolotti, South Windsor, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 604 days.

(21) Appl. No.: 10/868,259

(22) Filed: Jun. 15, 2004

(65) Prior Publication Data

US 2005/0275225 A1 Dec. 15, 2005

(51) Int. Cl.
*H02P 9/04* (2006.01)
*F03D 9/00* (2006.01)
(52) U.S. Cl. ........................................................ 290/44
(58) Field of Classification Search ................... 290/44
See application file for complete search history.

(56) References Cited

U.S. PATENT DOCUMENTS

| | | | |
|---|---|---|---|
| 158,676 A | 1/1875 | Chesebrough | 417/147 |
| 320,482 A | 6/1885 | Leavitt | 137/121 |
| 498,989 A | 6/1893 | Perry | 417/299 |
| 518,300 A | 4/1894 | Winegarden | 416/121 |
| 636,643 A | 11/1899 | Donnelly | 417/103 |
| 755,101 A | 3/1904 | Blackketter | 74/37 |
| 901,555 A | 10/1908 | Perry | 417/293 |
| 943,000 A | 12/1909 | Busby | 60/398 |
| 1,000,690 A | 8/1911 | Pichault | 417/250 |
| 1,006,812 A | 10/1911 | Ward | 4/238 |
| 1,035,431 A | 8/1912 | Ericson | 417/336 |
| 1,147,646 A | 7/1915 | Robbins | 417/214 |
| 1,211,161 A | 1/1917 | Jikihara | 417/1 |
| 1,254,737 A | 1/1918 | Smithey | 417/336 |
| 1,299,151 A | 4/1919 | Ebert | 416/23 |
| 1,342,318 A | 6/1920 | Yanacopoulos | 416/52 |
| 1,369,596 A | 2/1921 | Yanacopoulos | 417/336 |

(Continued)

FOREIGN PATENT DOCUMENTS

DE 410948 10/1925

(Continued)

OTHER PUBLICATIONS

*Webster's Third New International Dictionary of the English Language Unabridged*, G&C Merriam Co. (1971).*

(Continued)

*Primary Examiner*—T C Patel
*Assistant Examiner*—Pedro J Cuevas
(74) *Attorney, Agent, or Firm*—Carlson, Gaskey & Olds PC

(57) ABSTRACT

A wind power energy system includes a compression system that produces pressurized air with a first temperature that is received by a storage system at a second temperature that is approximately equal to the first temperature. The wind power energy system is insulated with about ten centimeters of glass-wool insulation to create an essentially adiabatic system. The pressurized air is utilized by a generator and generate electricity for a power grid. The generator also includes a combustion engine input. A control system detects fluctuation in wind power and commands the combustion engine to provide an appropriate amount of input energy to the generator such that the sum of the wind energy and combustion engine inputs produces a predetermined amount of electrical output by the generator.

1 Claim, 4 Drawing Sheets

U.S. PATENT DOCUMENTS

| | | | | |
|---|---|---|---|---|
| 2,112,633 A | | 3/1938 | Moon | 290/55 |
| 2,285,775 A | | 6/1942 | Keele | 290/4 D |
| 2,454,058 A | | 11/1948 | Hays | 60/398 |
| 2,484,291 A | | 10/1949 | Hays | 417/336 |
| 2,539,862 A | | 1/1951 | Rushing | 62/230 |
| 3,151,250 A | * | 9/1964 | Carlson | 290/52 |
| 3,806,733 A | | 4/1974 | Haanen | 290/55 |
| 3,996,741 A | | 12/1976 | Herberg | 60/398 |
| 4,008,006 A | | 2/1977 | Bea | 417/271 |
| 4,055,950 A | | 11/1977 | Grossman | 60/398 |
| 4,118,637 A | | 10/1978 | Tackett | 290/55 |
| 4,137,015 A | | 1/1979 | Grossman | 417/366 |
| 4,206,608 A | * | 6/1980 | Bell | 60/698 |
| 4,229,661 A | | 10/1980 | Mead et al. | 290/44 |
| 4,236,083 A | | 11/1980 | Kenney | 290/55 |
| 4,304,103 A | * | 12/1981 | Hamrick et al. | 62/228.1 |
| 4,358,250 A | | 11/1982 | Payne | 417/302 |
| 4,447,738 A | * | 5/1984 | Allison | 290/44 |
| 4,455,834 A | * | 6/1984 | Earle | 60/659 |
| 4,476,851 A | | 10/1984 | Brugger et al. | 126/247 |
| 4,525,631 A | * | 6/1985 | Allison | 290/4 R |
| 4,648,801 A | | 3/1987 | Wilson | 416/171 |
| 4,783,432 A | * | 11/1988 | Settlemyer | 502/34 |
| 5,384,489 A | * | 1/1995 | Bellac | 290/44 |
| 5,438,845 A | | 8/1995 | Kirschner et al. | 62/172 |
| 5,448,889 A | * | 9/1995 | Bronicki | 60/641.14 |
| 5,537,822 A | * | 7/1996 | Shnaid et al. | 60/659 |
| 5,642,629 A | * | 7/1997 | Ohman | 62/401 |
| 5,924,283 A | * | 7/1999 | Burke, Jr. | 60/325 |
| 6,581,384 B1 | * | 6/2003 | Benson | 60/653 |
| 6,581,394 B1 | * | 6/2003 | Smolenskiy | 62/172 |
| 6,672,087 B1 | * | 1/2004 | Taras et al. | 62/173 |
| 6,705,093 B1 | * | 3/2004 | Taras et al. | 62/90 |
| 6,769,487 B2 | * | 8/2004 | Hache | 166/302 |
| 6,927,503 B2 | * | 8/2005 | Enis et al. | 290/55 |
| 6,957,543 B1 | * | 10/2005 | Reznik | 62/93 |
| 6,959,546 B2 | * | 11/2005 | Corcoran | 60/517 |
| 6,963,802 B2 | * | 11/2005 | Enis et al. | 702/2 |
| 6,993,921 B2 | * | 2/2006 | Eisenhower et al. | 62/209 |
| 7,023,104 B2 | * | 4/2006 | Kobashikawa et al. | 290/42 |
| 7,051,542 B2 | * | 5/2006 | Chen et al. | 62/160 |
| 7,067,937 B2 | * | 6/2006 | Enish et al. | 290/55 |
| 2002/0061251 A1 | | 5/2002 | McCabe | 417/336 |
| 2002/0144504 A1 | | 10/2002 | Merswolke et al. | 60/398 |
| 2003/0105556 A1 | | 5/2003 | Enis et al. | 700/286 |

FOREIGN PATENT DOCUMENTS

| | | |
|---|---|---|
| FR | 2404124 | 4/1979 |
| GB | 2125486 | 3/1984 |

OTHER PUBLICATIONS

European Search Report, dated Oct. 31, 2008.

* cited by examiner

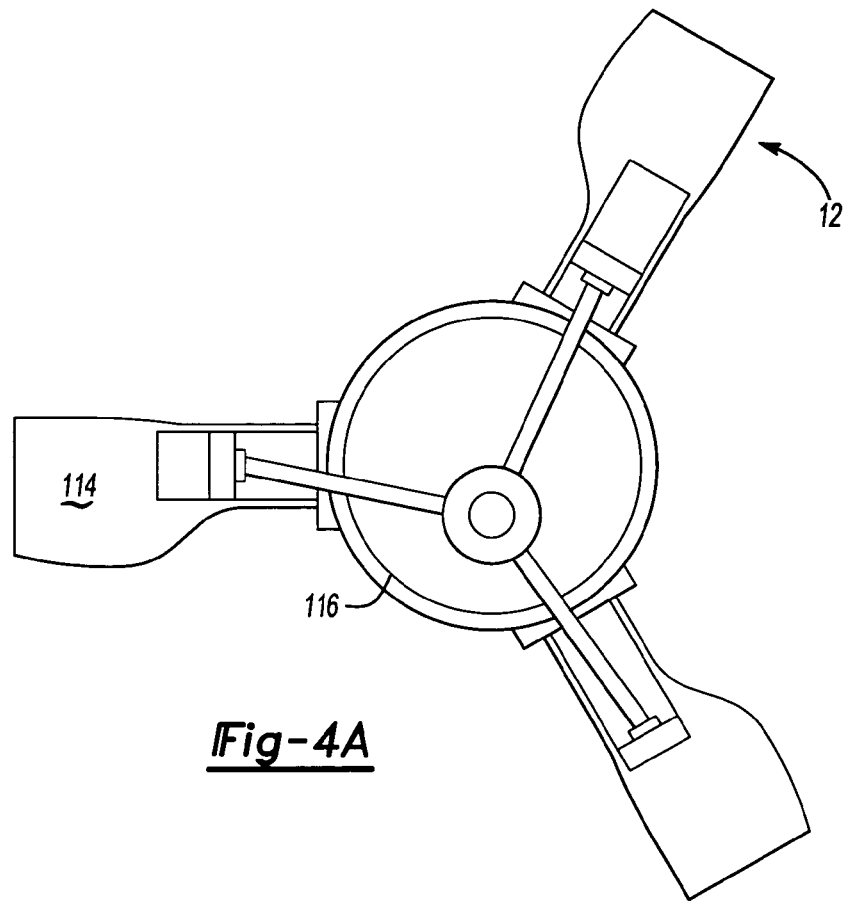
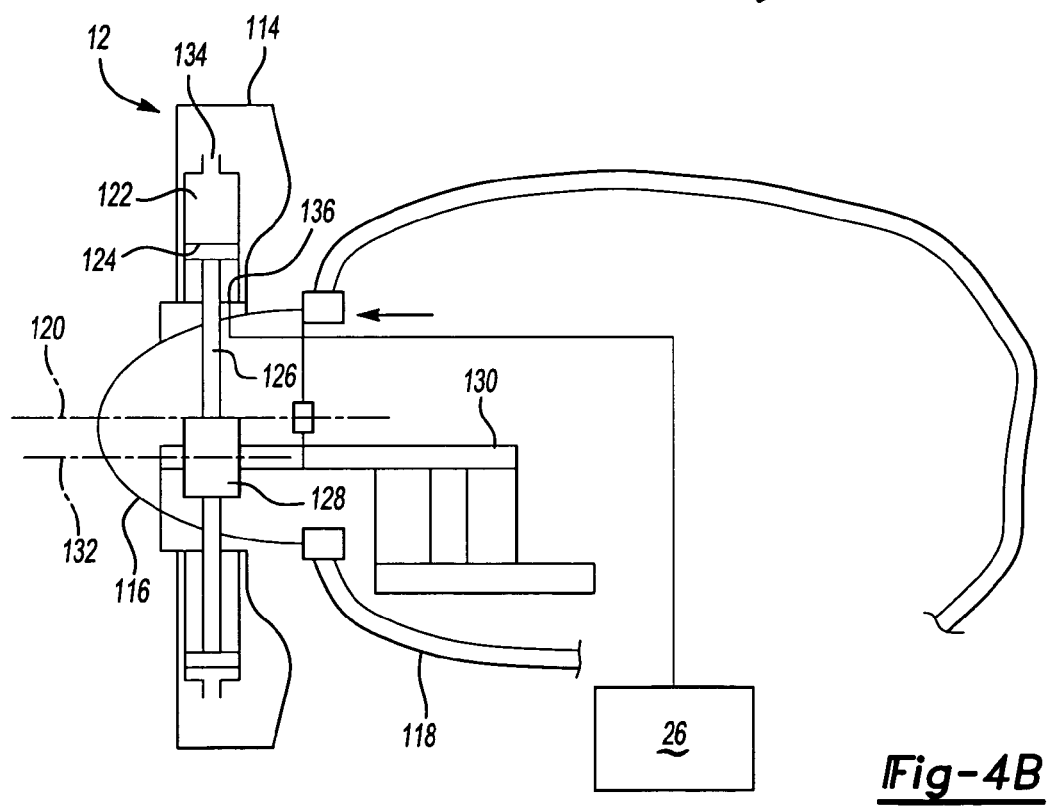

WIND POWER SYSTEM FOR ENERGY PRODUCTION

BACKGROUND OF THE INVENTION

This invention relates to wind power energy and, more particularly, to a wind power energy system that produces a generally constant pressurized air pressure with modest heat energy loss to generate reliable electrical output.

Wind power is a rapidly growing segment of the electric power generation industry. A "dedicated generator" design utilizes a wind turbine to input rotational energy directly into an electric generator to generate and supply electricity to a power grid. The wind turbine is connected to a gearbox that converts the typical fifteen to thirty revolutions per minute of the wind turbine to 1500 to 3600 revolutions per minute required for an electric generator. The gearbox is a noisy, heavy, and expensive component of the wind tower and it is generally desirable to eliminate it from the wind tower design.

Another type of wind tower design utilizes a wind turbine to drive a compressor that produces pressurized air, which is stored in a tank. Pressurized air rotates a turbine attached to an electric generator to supply electricity to the power grid.

In particular, several drawbacks exist for conventional wind power systems with regard to electricity generation. For one, the amount of energy produced by conventional wind towers varies. One contributing factor to the variation is natural variation in wind speed. For the dedicated generator design, wind speed variation leads directly to spikes in the amount of electricity that the generator produces. For pressurized air storage designs, wind speed variation leads to variation in the pressure of the stored pressurized air. More importantly, in conventional designs the varying amount of electricity supplied to the power grid makes wind generated power difficult to sell in the energy market, which requires selling power more than twenty-four hours in advance.

Some conventional wind power systems utilize supplemental power input. When the amount of electricity generated by a conventional wind power system fails to meet the required demand, additional electricity from a remote off-site generator is transmitted to the wind power site to supplement the wind power electricity. This introduces significant additional costs, infrastructure, and inefficiencies to the system.

Other conventional wind power systems utilize two types of wind towers. One tower generates electricity for immediate use and another type of tower produces pressurized air to store energy for later generation of electricity. When wind conditions are inadequate for the first type of tower to immediately meet electricity demands, the pressurized air produced by the second type of tower can be utilized to generate supplemental electricity. Although this type of wind power system addresses variation in electricity generation, there is still demand for more efficient wind power systems.

In the power industry in general, a dual input generator utilizes the input of a first combustion engine to generate electricity and the input of a second combustion engine to supplement the first combustion engine when additional electrical output is desired. Combustion engines, however, utilize conventional hydrocarbon fuels and therefore suffer considerable expense and environmental impact.

Another drawback for conventional pressurized air wind power systems is inadequate operational efficiency. The percent of wind energy that actually results in electric energy produced is typically less than forty percent for conventional wind towers. The considerable loss in efficiency can come from a variety of sources. For one, the loss of heat energy when air is compressed accounts for approximately fifty percent of the total energy lost. The compression ratio produces pressurized air having an extremely high temperature, for example 600° C. The extreme temperature and heat exceeds a maximum temperature limit of the materials making the wind power system and must therefore be dissipated in order to avoid failure of the system. Dissipation occurs through inter-cooling in the compression system and loss of heat to the outer surrounding environment.

Another source of operational efficiency loss in conventional pressurized air wind power systems is waste of potential power from turbine rotation when the wind speed varies from a pre-selected design point. The rotational speed of the wind turbine scales linearly with wind speed, but the power generated by the wind turbine scales with the cube of the wind speed. This forces either the air compressor compression ratio to vary strongly with wind speed or the wind turbine to operate far away from peak aerodynamic efficiency in order to dissipate or forego a portion of wind power. The resulting inefficiencies lead to higher expense to produce wind generated electricity.

Despite dual input generators and existing conventional wind power systems, a demand remains for a wind power system that is reliable, efficient, and cost effective. Accordingly, it is desirable to provide a wind power system with low variation in the amount of electricity generated and high operational efficiency.

SUMMARY OF THE INVENTION

The wind power energy system of the present invention includes a wind turbine that rotates in response to wind and powers a compression system that produces pressurized air with a first temperature. The compression system includes insulation to slow the rate of heat loss, creating an essentially adiabatic system. A storage system including a wind tower storage portion receives the pressurized air at a second temperature that is approximately equal to the first temperature of the pressurized air produced by the compression system. A nozzle transfers the pressurized air from the wind tower storage portion to a primary storage portion. In the primary storage portion, the pressurized air flows through a conduit and a flow control valve and impinges on a generator turbine. The generator turbine rotates a shaft and a rotor of a generator to generate electricity. The electricity generated is supplied to a power grid. A second input in the form of a combustion engine is coupled to the generator. The generator uses the combustion engine energy when the first input energy provided by the wind power energy system fluctuates to continue producing a predetermined amount of electrical output. The combustion engine further includes an exhaust conduit that directs hot exhaust from the combustion engine to an air-to-air heat exchanger located on the conduit of the primary storage portion.

In one example, the second temperature is at least 50% of the first temperature. Even though 50% represents an improved conservation of the temperature component of the potential energy compared to the prior art, even greater temperature conservation can be required.

In another example, the second temperature is about 85% of the first temperature. To achieve 85%, the insulation is a glass-wool insulation that has a heat conductivity of about 0.04 W/(m·K) and a thickness of about 10 cm.

In another example, the second temperature is lower than a maximum temperature limit of the material making the wind power energy system. The maximum temperature generated by the compression system is controlled by the compression ratio of the compression system.

In another example, the compression ratio is 8:1. An 8:1 compression ratio yields a pressurized air temperature of about 300° C. and is preferred in order to allow the inexpensive materials typically used in a wind power energy system to operate within a desired temperature range.

In another example, the wind power energy system includes thirty-three wind towers that are each capable of generating 1.5 MW of maximum power. The entire wind power energy system is capable of generating approximately 50 MW of power. The wind tower storage portion of each wind tower contributes a volume of approximately 900 cubic meters to the primary storage portion and is maintained at a pressure of about 7.5 bars. The primary storage portion holds approximately 10,000 cubic meters and has a pressure between 7.0 bars and 8.0 bars.

In another example, the compression system includes a plurality of clutches and air compressors. The air compressors are arranged in a parallel relation to each other such that each air compressor has an independent, or mutually exclusive, air inlet. A control logic circuit communicates with the wind turbine and the plurality of clutches and closes or opens a predetermined number of clutches to engage or disengage the associated air compressors in response to changing wind conditions. The number of air compressors engaged at any one time is determined by the power being extracted by the wind turbine.

In another example, the wind power energy system thereby operates in a steady state air pressure condition. The control system communicates with the flow control valve and the compression system and commands the flow control valve to allow a predetermined amount of compressed air to be used to rotate the generator turbine. The control system determines the predetermined amount of compressed air such that the amount of compressed air used for rotating the generator turbine is about equal to the amount of compressed air produced by the compression system.

In another example, a plurality of air compressors is arranged in a series relation such that a conduit fluidly connects the air outlet to the air inlet of the next air compressor in the series. A control logic circuit communicates with the wind turbine and each valve and determines how many air compressors to employ depending on the wind speed. A constant pressure of pressurized air is produced.

In another example, the wind turbine blades include cylinders and pistons Rotation of the wind turbine and turbine blades causes the pistons to stroke in the cylinders and pressurize air. The pressurized air is stored in a wind tower storage portion.

The wind power system according to the present invention provides low variation in the amount of electricity generated and high operational efficiency.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 4A illustrates a schematic view of a series-configured compression system;

FIG. 4B illustrates a cross sectional view of the example compression system in FIG. 4A.

DETAILED DESCRIPTION OF THE PREFERRED EMBODIMENT

Figure 1:
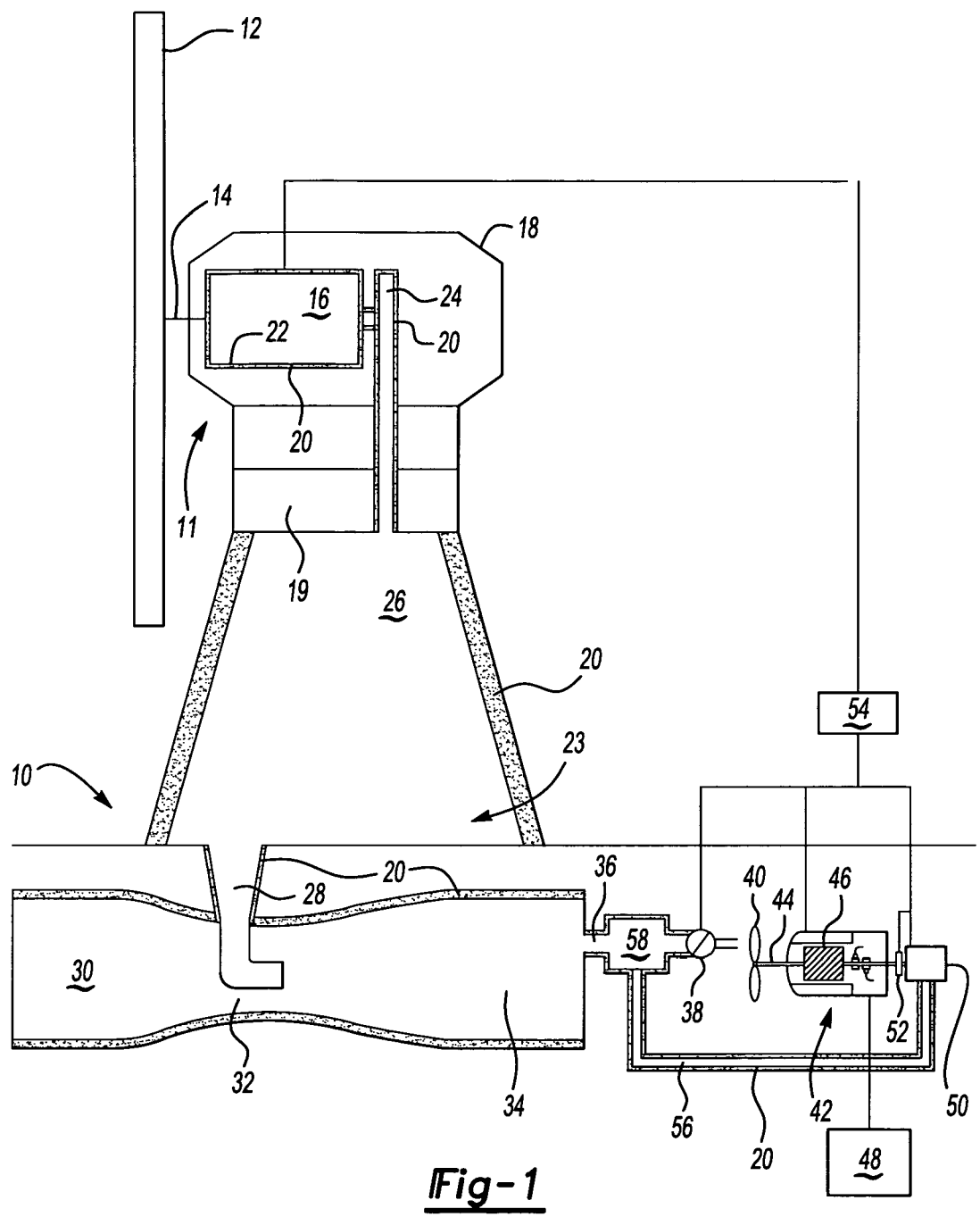
FIG. 1 illustrates a schematic view of a wind power energy system.

FIG. 1 illustrates a schematic view of a wind power energy system 10. The wind power energy system 10 includes a wind tower 11 with a wind turbine 12 connected to a power distributor 14. The power distributor 14 supports the wind turbine 12 and transmits power from the wind turbine 12, in response to wind, to a compression system 16 that produces pressurized air with a first temperature. The pressurized air has potential energy, including a pressure component and a temperature component. Loss of pressure and/or loss of temperature (heat) reduces the total amount of potential energy stored in the pressurized air. It is to be understood that the wind power energy system 10 typically includes multiple wind towers 11 to produce pressurized air.

A nacelle 18 houses the compression system 16. Both the compression system 16 and nacelle 18 are disposed on a yaw orientation system 19. The yaw orientation system 19 allows the nacelle 18 and wind turbine 12 to be oriented in the most favorable direction in relation to a wind direction.

The inventive compression system 16 includes insulation 20 that sheaths the periphery 22 to slow the rate of heat loss across the periphery 22. A conduit 24 transfers the pressurized air from the compression system 16 to a storage system 23. The storage system 23 includes a wind tower storage portion 26 that receives pressurized air from the compression system 16. The pressurized air received is at a second temperature that is approximately equal to the first temperature of the pressurized air produced by the compression system 16. A nozzle 28 transfers pressurized air from the wind tower storage portion 26 to a primary storage portion 30 of the storage system 23.

The primary storage portion 30 acts as a venturi to mix compressed air from the wind tower storage portion 26 with compressed air in the primary storage portion 30 even when the pressure in the wind tower storage portion 26 is lower than the pressure in the primary storage portion 30. Flow of compressed air in the primary storage portion 30 is accelerated through a throat portion 32 and flow of compressed air from the wind tower storage portion is accelerated in the nozzle 28 such that the mixing of the two flows occurs at lower pressure than either before the flow accelerations. The combined flow is then decelerated and the pressure is recovered in a downstream portion 34 of the primary storage portion 30.

Pressurized air from the primary storage portion 30 flows through a conduit 36 and a flow control valve 38. The flow control valve 38 regulates the mass-rate and pressurized air pressure to the generator turbine 40, and is the principle means by which the pressurized air pressure in the primary storage potion 30 is controlled.

The pressurized air, acting as a first input for a generator 42, provides a first energy by rotating the generator turbine 40 which in turn rotates a shaft 44 and a rotor 46 of the generator 42 to generate electricity. The flow control valve 38 regulates the amount of electrical power generated by controlling the mass flow rate and pressurized air pressure that is allowed to impinge on the generator turbine 40. The electricity generated is supplied to a power grid 48.

The rotor 46 also includes a second input in the form of a combustion engine 50 that is coupled to the rotor 46 and shaft 44. A clutch 52 is disposed between the rotor 46 and the combustion engine 50 for selectively engaging and disengaging the combustion engine 50 with the shaft 44. The generator 42 uses a second input energy from the combustion engine 50 to generate electricity and supply electricity to the power grid 48.

The generator 42 utilizes wind power input energy and combustion engine input energy to generate a predetermined amount of electricity. The generator 42 includes a control system 54 that communicates with the wind power energy system 10, the combustion engine 50, and the generator 42. When the first input energy provided by the wind power energy system 10 fluctuates, the control system 54 detects the fluctuation and commands the combustion engine 50 to provide the appropriate amount of second input energy to the generator such that the sum of the first energy and second energy produces the predetermined amount of electrical output by the generator 42. The combustion engine 50 compensates for fluctuating wind conditions over a duration longer than about ten minutes and allows the generator 42 to supply a generally constant amount of electricity to the power grid even when the wind speed varies.

The combustion engine 50 further includes an exhaust conduit 56 with insulation 20. The exhaust conduit 56 directs hot exhaust from the combustion engine 50 to an air-to-air heat exchanger 58 located on the conduit 36 of the wind power energy system 10. It is to be understood that a variety of heat exchanger types may be used, including but not limited to a heat exchanger with an organic Rankine cycle system. The heat exchanger 58 utilizes the hot exhaust to transfer heat from the hot exhaust to the compressed air before it flows through the flow control valve 38, thereby increasing the temperature component of the potential energy of the compressed air and increasing the efficiency of the wind power energy system 10.

The insulation 20 is important in the wind power energy system 10 for maintaining an essentially adiabatic system. The pressurized air produced by the compression system 16 has a first temperature. When the pressurized air is received by the wind tower storage portion 26 it has a second temperature that is approximately equal to the first temperature. A loss of temperature between the compression system 16 and the wind tower storage portion 26 results in loss of potential energy in the pressurized air and ultimately to lower operational efficiency of the wind power energy system 10. Unlike prior art wind power systems, the inventive wind power energy system 10 conserves at least more than 50% of the heat energy produced in pressurizing the air. Thus, the insulation 20 that generally surrounds the compression system 16 and primary storage portion 30 is a key factor of maintaining an adiabatic system.

In one example, the second temperature is at least 50% of the first temperature. Prior art wind power systems lose or dissipate large amounts of heat during compression of the pressurized air and do not achieve a 50% level. Even though 50% represents an improved conservation of the temperature component of the potential energy compared to the prior art, even greater temperature conservation can be required for commercial viability.

In another example, the second temperature is about 85% of the first temperature. To achieve 85%, the insulation 20 is a glass-wool insulation that has a heat conductivity of about 0.04 W/(m·K) and a thickness of about 10 cm. The insulation 20 preferably surrounds all portions of the wind power energy system 10. This includes at least the compression system 16, conduit 24, wind tower storage portion 26, nozzle 28, primary storage portion 30, and conduit 36, which all provide thermal storage when insulated. It should be understood that other types of insulation having different heat conductivities and requiring difference thicknesses may be utilized.

In another example, the second temperature is lower than a maximum temperature limit of the material making the wind power energy system 10. The maximum temperature generated by the compression system 16 is controlled by the compression ratio of the compression system 16. The maximum compression ratio of pressurized air to ambient 20° C. air from the surrounding environment is about 12:1 and results in the pressurized air having a temperature of about 375° C. The materials used to construct the wind power energy system 10 are inexpensive standard materials. That is, the materials are standard grade steels or other materials that are not highly specialized for high temperature performance. The standard materials have a maximum temperature limit of about 375° C. and therefore can operate without failure when the compression system 16 utilizes a compression ratio of 12:1 and produces pressurized air having a temperature of about 375° C.

In another example, the compression ratio is 8:1. Utilizing an 8:1 compression ratio yields a pressurized air temperature of about 300° C. A compression ratio of about 8:1 is preferred in order to allow the materials making the wind power energy system 10 to retain a safe amount of physical strength and structural integrity.

In another example, the wind power energy system 10 includes thirty-three wind towers 11 that are each capable of generating 1.5 MW of maximum power. The entire wind power energy system 10 is capable of generating approximately 50 MW of power. The wind tower storage portion 26 of each wind tower 11 contributes a volume of approximately 900 cubic meters to the primary storage portion 30 and is maintained at a pressure of about 7.5 bars. The primary storage portion 30 holds approximately 10,000 cubic meters and has a pressure between 7.0 bars and 8.0 bars. The pressure between the wind tower storage portion 26 and the primary storage portion 30 is maintained in a steady state pressure condition by the control system 54. In particular, wind gusts and other variation in wind speed that can cause variation in prior art wind systems are absorbed through variation in air pressure of plus or minus 0.5 bars in the wind tower storage portions 26 of the thirty-three wind towers 11. This allows the wind power energy system to absorb wind speed variation that occurs for a duration of less than approximately ten minutes. Larger variations in air pressure in the wind tower storage portion 26 can be absorbed by utilizing a lower pressure such as 6 bars instead of 7.5 bars in the wind tower storage portion 26. Furthermore, the operational efficiency of the wind power energy system 10 is only weakly dependent on the air pressure. That is, the system operates at 82% efficiency at 8 bars and about 75% at 3 bars.

In another example, the wind power energy system 10 includes a single wind tower 11. The generator 42 and the combustion engine 50, such as a diesel engine are located near the single wind tower 11. That is, the generator 42 and combustion engine 50 are not remote from the single wind tower 11 and therefore do not require separate foundations, housings, power conditioners, and the like. Therefore, certain benefits, such as lower expense, may be obtained by locating the generator 42 and the combustion engine 50 near to the wind tower 11.

Figure 2A:
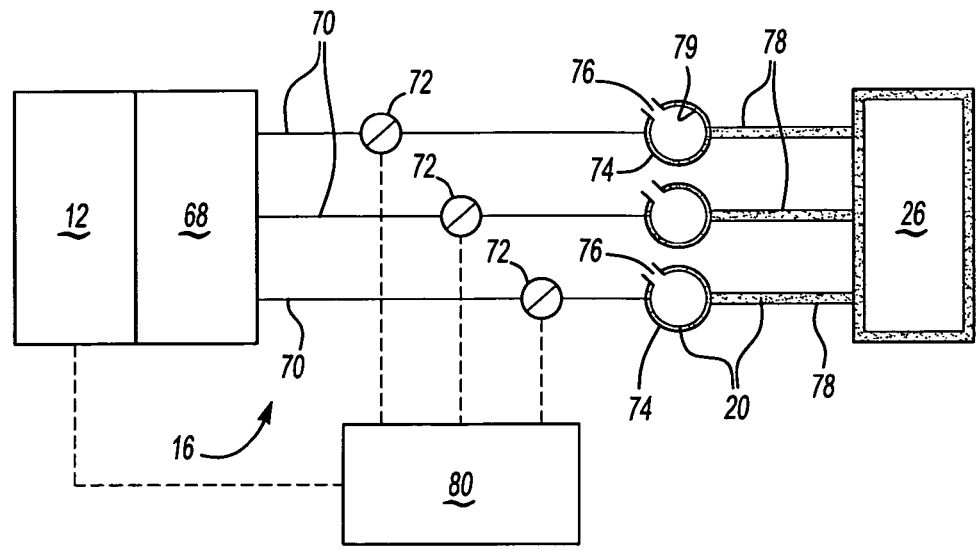
FIG. 2A illustrates a schematic view of a parallel-configured compression system.

FIG. 2A illustrates a schematic view of one example of the compression system 16. The wind turbine 12 is a first source of energy producing a variable energy from harnessing the wind. The compression system 16 includes a power distributor 68 coupled to the wind turbine 12 to receive the variable wind energy in the form of rotational power. The power distributor 68 transmits the rotational power to a plurality of secondary shafts 70 that are coupled, respectively, to a plurality of clutches 72 and air compressors 74.

The air compressors 74 each include an air inlet 76 for intaking air from the outside environment and a conduit 78 for transferring pressurized air to the wind tower storage portion 26. The air compressors 74 generally each have an isentropic efficiency of at least 70% and preferably 85%, and are arranged in a parallel relation to each other such that each air compressor 74 has an independent, or mutually exclusive, air inlet 76. That is, the air inlet of any one air compressor 74 is not in direct fluid communication with any other air compressor and each air compressor 74 independently supplies pressurized air to the wind tower storage portion 26. Each air compressor 74 and conduit 78 also includes insulation 20 that sheaths the periphery 79 and slows the rate of heat transfer to the outside environment. It should be understood that this is but one example configuration out of many possible parallel air compressor configurations that can be utilized in employing the invention.

The compression system 16 further includes a control logic circuit 80 that at least communicates with the wind turbine 12 and the plurality of clutches 72. When the wind speed is relatively high, the control logic circuit 80 closes a predetermined number of the plurality of clutches 72 to engage the associated air compressors 74. When the wind speed is relatively low, the control logic circuit 80 opens a predetermined number of the plurality of clutches 72 to disengage the associated air compressors 74.

The number of air compressors 74 engaged at any one time is determined by the power being extracted by the wind turbine 12 from a first source of energy, the wind. The power extracted changes with the cube of the wind speed. The number of air compressors 74 engaged increases or decreases in proportion to the power being extracted by the wind turbine 12, thus yielding energy in the form of constant pressurized air with varying mass flux. The wind tower storage portion 26 receives the pressurized air and acts as a second source of energy supplying constant pressure pressurized air to a third source of energy, the primary storage portion 30. Furthermore, when the number of air compressors 74 engaged is less than the maximum number of compressors, the control logic circuit 80 selects which of the air compressors 74 to engage so as to distribute the "wear and tear" evenly among all the air compressors 74.

In one contemplated mode of operation, the ratio of pressurized air pressure to ambient air pressure inside the wind tower storage portion 26 is approximately 7.5:1 and the ratio in the primary storage portion 30 is approximately 8:1, although a more preferred condition would be equal air pressure. The control system 54 communicates with at least the flow control valve 38 and the compression system 16 and commands the flow control valve 38 to allow a predetermined amount of compressed air to be used to rotate the generator turbine 40. The control system 54 determines the predetermined amount of compressed air such that the amount of compressed air used for rotating the generator turbine 40 is about equal to the amount of compressed air produced by the compression system 16. The wind power energy system 10 thereby operates in a steady state air pressure condition.

In another example, the first source of energy producing variable energy is the wind tower storage portion 26. The wind tower storage portion 26 stores and transfers pressurized air from the compression system 16. The pressure of pressurized air in the wind tower storage portion 26 can vary. Preferably, the variation is not greater than plus or minus 0.5 bars from a predetermined pressure. A second source of energy, the primary storage portion 30, receives pressurized air from the wind tower storage portion 26 and produces constant energy. The constant energy is in the form of a constant mass-rate from the flow control valve 38. The constant mass-rate of pressurized air is received by a third source of energy, the generator 42.

Figure 2B:
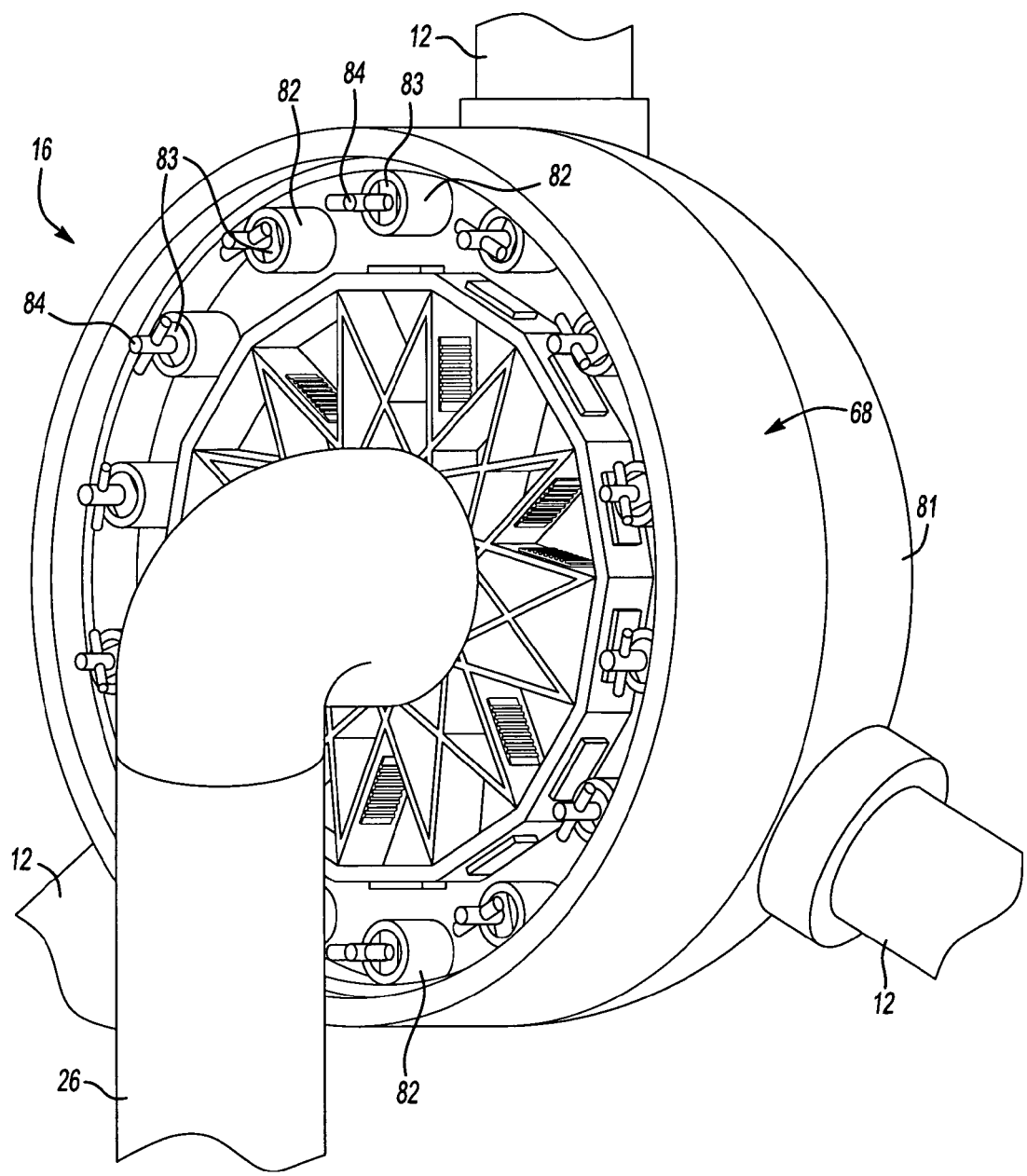
FIG. 2B illustrates an example embodiment of a parallel-configured compression system.

FIG. 2B illustrates another example of the compression system 16 having a parallel arrangement. The wind turbine 12 rotates the power distributor 68, which includes a hub 81. The hub 81 rotates and transmits rotational power to a plurality of rotating cylinders 82 that are coupled, respectively, to a plurality of clutches 83 and a plurality of air compressors 84. The plurality of air compressors 84 are arranged in a parallel relation to each other such that each air compressor 84 has an independent, or mutually exclusive, air intake. The plurality of clutches 83 may be selectively controlled such that when the wind speed is relatively high, a predetermined number of the plurality of clutches 83 are closed to engage the associated air compressors 84. When the wind speed is relatively low, a predetermined number of the plurality of clutches 83 are opened to disengage the associated air compressors 84. The number of engaged air compressors 84 increases or decreases in proportion to the power being extracted by the wind turbine 12, thus providing energy to the wind tower storage portion 26 in the form of constant pressurized air with varying mass flux.

Figure 3:
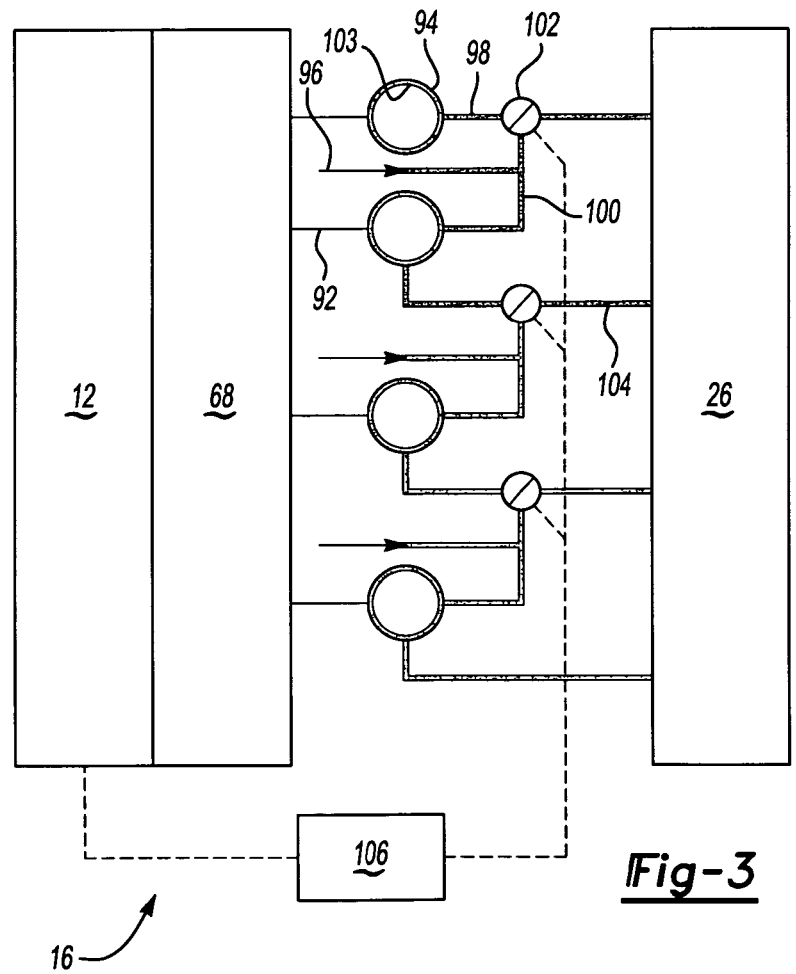
FIG. 3 illustrates a schematic view of a series-configured compression system.

FIG. 3 illustrates a schematic of another example of a compression system 16. The compression system 16 includes a wind turbine 12 that transmits variable energy from wind in the form of rotational power to the power distributor 68. The power distributor 68 transmits the rotational power to a plurality of secondary shafts 92 that are coupled, respectively, to a plurality of air compressors 94. The air compressors 94 generally each have an isentropic efficiency of at least 70% and preferably 85%. Each compressor 94 includes an air inlet 96 and air outlet 98. The plurality of air compressors 94 are arranged in a series relation such that a conduit 100 fluidly connects the air outlet 98 to the air inlet 96 of the next air compressor 94 in the series. The conduit 100 also includes a one-way valve 102 for selectively directing compressed air from the conduit 100 to the conduit 104 or to the air inlet 96, depending on a predetermined desired pressurized air level. It should be understood that this is but one example configuration out of many possible different configurations of air compressors in series that can be utilized in employing the invention.

Each air compressor 94, conduit 100, and valve 102 also includes insulation 20 that slows the rate of heat transfer to the outer environment. The insulation 20 that sheaths the air compressors 94 is located on the periphery 103 of each air compressor 94.

The compression system 16 includes a control logic circuit 106 that at least communicates with the wind turbine 12 and each valve 102. The control logic circuit 106 determines how many air compressors 94 to employ depending on the wind speed. When the wind speed is relatively low compared to a pre-selected wind speed, all the valves 102 are opened and the maximum number of air compressors 94 is employed. This results in a predetermined constant pressure of pressurized air. When the wind speed is relatively high, the control logic circuit 106 closes a predetermined number of the valves 102 to employ fewer air compressors 94. This results in the same predetermined constant pressure of pressurized air, although the mass flux of pressurized air varies.

FIGS. 4A and 4B illustrate another example of the compression system 16. The wind turbine 12 includes turbine blades 114 coupled to a hub 116. The hub is coupled to the nacelle and rotates around an axis 120. The turbine blades 114 include cylinders 122 that each houses a piston 124. The piston 124 is coupled to a rod 126 that extends to and attaches to a hub 128. The hub 128 rotates about a fixed support rod 130 that is attached within the nacelle 118. The support rod 130 defines a secondary axis 132 that is located a distance from the axis 120.

The wind rotates the wind turbine 12 around the axis 120. The rotation of the wind turbine 12 and turbine blades 114 causes the rod 126 and hub 128 to also rotate. The rod 126 and hub 128 rotate about the secondary axis 132 that is a distance from the axis 120, thereby causing the pistons 124 to stroke in the cylinders 122. The stroking of the pistons 124 intakes air through an air intake 134, pressurizes the air, and transfers the pressurized air through an outlet 136 to the wind tower storage portion 26.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A wind power energy system comprising:
   a compression system producing pressurized air having a first temperature;
   a storage system receiving said pressurized air at a second temperature substantially equal to said first temperature, wherein the storage system includes a first storage portion and a second, different storage portion that each hold the pressurized air from the compression system, and the second storage portion includes a venturi section that accelerates pressurized air within the second storage portion; and
   insulation for maintaining the second temperature substantially equal to the first temperature.

* * * * *